United States Patent Office 3,441,981
Patented May 6, 1969

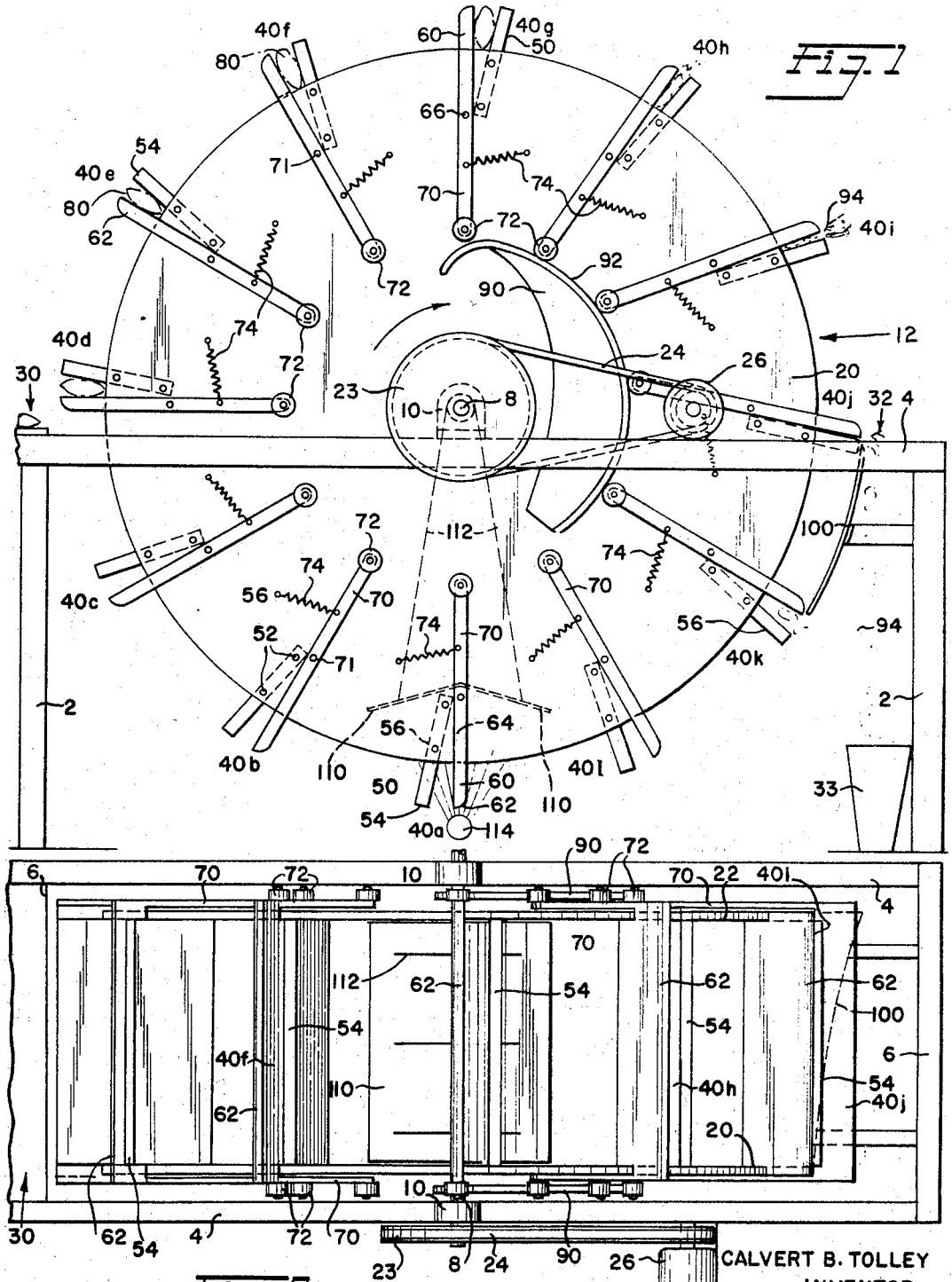

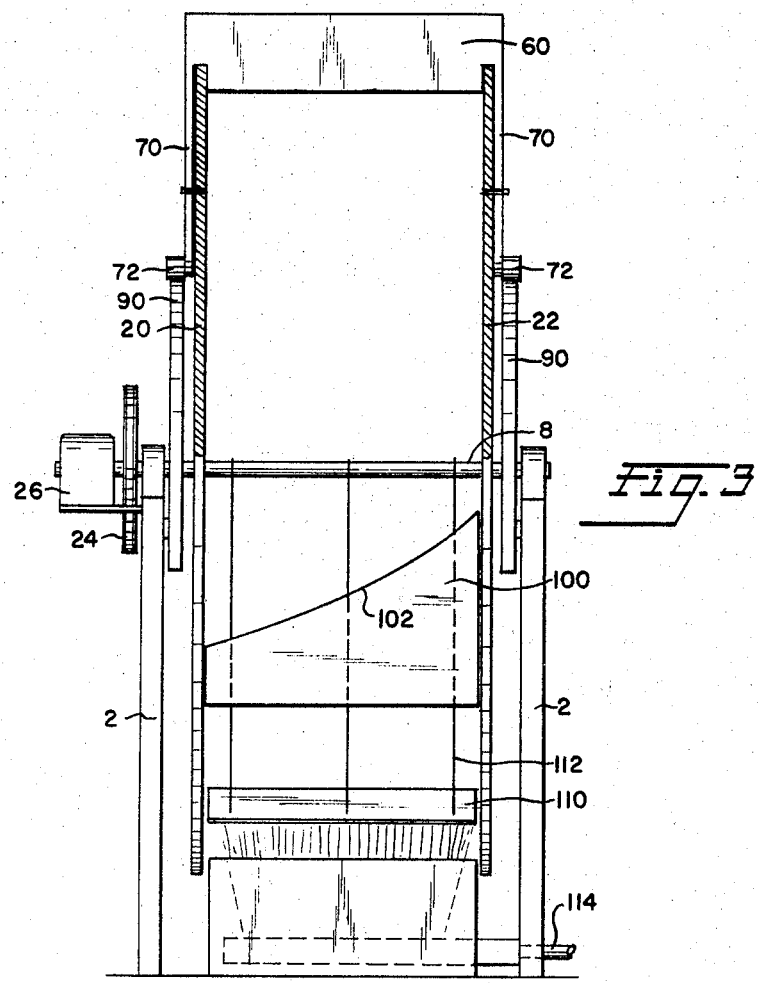
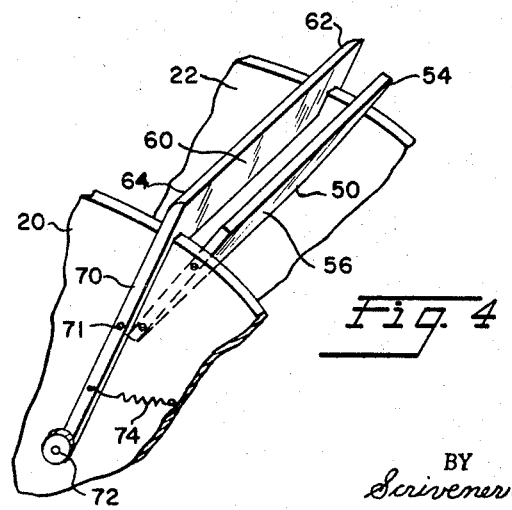
Fig. 3
Fig. 4
INVENTOR
CALVERT B. TOLLEY

3,441,981
MACHINE FOR REMOVING MEAT FROM PARTS OF A CRAB
Calvert B. Tolley, Wingate, Md. 21675
Filed Mar. 30, 1967, Ser. No. 627,091
Int. Cl. A22c 29/00
U.S. Cl. 17—71                                         3 Claims

ABSTRACT OF THE DISCLOSURE

Machine for squeezing meat from pre-cut parts of a hard shell crab, having a rotating body carrying a member of pairs of vanes, one vane of each pair being movable toward and away from the other as the body rotates. Pre-cut crab parts are placed between the vanes of each pair at a loading station, and as the body rotates the movable vane of each pair is moved toward the fixed vane to squeeze out the crab meat, which is removed at a delivery station and collected for use. The remaining trash is removed as the movable vanes move away from the fixed vanes after leaving the delivery station, and this separation permits additional pre-cut crab parts to be placed between the vanes of each pair.

Summary of the invention

In processing the body of the Chesapeake Bay hard shell crab the removal of the backfin lumps which are the parts of greatest economic value, leaves bony pieces, known in the industry as the top cut, which have small bony chambers containing meat which is less valuable than the backfin lumps but which can be used in many ways, including soups, crab cakes and the like, and which is of value to recover. Because of the bony, chambered structure of these top cut pieces, the removal of the meat from them by hand picking is laborious and costly and greatly reduces the economic value of the meat which is recovered, making these pieces of marginal economic value when picked by hand or other known means.

It has accordingly been the principal object of this invention to provide mechanical, continuously operating means for removing the meat from the top cut pieces, this being accomplished in the present invention by the provision of a constantly rotating body having on it a plurality of sets of fixed and movable vanes. As the body rotates, each set of vanes moves from a loading zone, where one or more of the top cut pieces is placed between the vanes of each pair, then through an arc of approximately 180° during a part of which travel each movable vanes moves toward and substantially into engagement with the fixed vane of its pair, squeezing the meat from each piece between the two vanes to a position outside the outer edges of the vanes, then to a delivery zone where the squeezed-out meat is removed. During the travel from the delivery zone to the loading zone the movable vane of each pair moves away from the fixed vane to permit the remaining bony part of each top cut piece to be removed by gravity and water flushing, so that when each pair of vanes arrives at the loading zone they are fully separated and free of crab pieces and parts and may receive new pieces between them for processing.

Description of the drawings

FIG. 1 is a side elevational view of a machine according to the invention for processing top cut pieces of a cooked hard crab to remove edible meat therefrom;

FIG. 2 is a top elevational view of the machine of FIG. 1;

FIG. 3 is a perspective view thereof, and

FIG. 4 is a perspective view showing a pair of vanes forming part of the machine.

Detailed description of the invention

The machine provided by the invention for removing edible meat from bony top cut pieces of a cooked hard shell crab comprises a frame having upright legs 2 supporting spaced, parallel horizontal side members 4 and end members 6. A shaft 8 is rotatably supported in aligned bearings 10 on the side members 4 and has a rotatable body mounted on it which is generally designated by numeral 12. This body comprises two spaced, parallel, circular side members 20, 22 which are concentrically mounted on shaft 8 for rotation therewith and are spaced laterally of each other on the frame in parallelism to the side members 4 thereof, as particularly shown in FIG. 2. A pulley 23 is also mounted on shaft 8 externally of the side member 20 and is connected by belt 24 to motor 26, whereby the rotatable body consisting of the side members 20, 22 and shaft 8 may be continuosly rotated. A switch (not shown) may be provided to control the operation of the motor. At one end of the horizontal part 4, 6 of the supporting frame there is a loading station 30 at which is kept a supply of top cut or other crab pieces which are to be processed to remove the meat therefrom, while at the other end of the machine frame, in the direction of rotation of the rotatable assembly, there is a delivery station 32 at which there is provided a container 33 to receive the meat produced by operation of the machine, the two stations being separated by approximately 180° of the travel of the rotatable assembly.

Means are provided by the invention for receiving top cut or other crab pieces at the loading station, moving them to the delivery station with the rotating assembly, removing the edible crab meat therefrom during such travel, and delivering the meat to the container at the delivery station. These means comprise a plurality (twelve being shown for example) of pairs or sets of vanes which are carried by the rotating assembly and extend radially thereof and are equally spaced in a circular series about the side members 20, 22 as shown in FIG. 1, the sets being designated by the numerals 40a to 40l, inclusive. Each pair or set of vanes comprises a fixed vane 50 having a flat surface in the direction away from the direction of rotation of rotatable body 12, which is positioned between the two side members 20, 22 of the rotating assembly and is connected at its ends to the side members by screws 52 or the like. The outer edges 54 of these fixed vanes are positioned radially outside the outer peripheries of the side members 20, 22 of the rotating assembly, and the vanes are of small radial dimension in relation to the side members, their inner edges 56 being sufficiently inside the transversely aligned peripheries of the side members so that the radial dimension of each fixed vane permits it to receive and hold the crab pieces which are to be processed.

Each pair of vanes also includes a movable vane 60 which extends in general parallelism to the fixed vane, with its outer edge 62 adjacent the outer edge of the fixed vane and its inner edge 64 adjacent the inner edge of the fixed vane, each movable vane also being positioned within the rotatable assembly between the side members thereof. Each movable vane has an elongated arm 70 connected to each of its ends, and these arms are positioned, respectively, outside the adjacent side members 20, 22 and extend radially inwardly of the rotating assembly from the inner edge of the movable vane. Each of these arms is pivotally connected between its ends to the adjacent side member 20 or 22 of the rotating assembly, as shown at 71, and each has a roller 72 mounted on its inner end.

Each movable vane is normally maintained in substantially parallel, but separated, relation to its associated fixed vane by an extension spring 74 which is connected at its ends, respectively, to the adjacent side member 20 or 22 and to the arm 70 radially inwardly of the pivot 71. The springs are effective to hold apart the vanes of each pair during the greater part of the travel of the vanes with the rotating assembly, and are operative to hold the vanes apart at all parts of such travel except over a short arc on the approach side of the delivery station at 32. Thus, the vanes are separated from each other at the loading station 30 to receive crab pieces such as those shown at 80, and are also separated after leaving the delivery station at 32, thus permitting one or more crab pieces 80 to be placed between the vanes of each pair at the loading station and also permitting the bony trash to fall from between them while they are separated during travel from the delivery station to the loading station.

Means are provided by the invention for moving each movable vane toward and into substantial engagement with the fixed vane of its pair during that part of the travel of each pair just preceding its arrival at the delivery station at 32, thereby to squeeze the crab piece or pieces which are between them and remove the meat therefrom. Such means comprises the two fixed cam members 90 which are mounted on the machine frame outside of and adjacent the side members 20, 22 respectively, and each of which has an arcuate cam surface 92 which begins on the approach side of the delivery station and ends just on the downstream side thereof. Each cam surface is so positioned and shaped that it engages the roller 72 on the arm 70 of each movable vane and moves the vane about its pivotal support 71 toward and into substantial engagement with its associated fixed vane, squeezing the edible meat from any crab pieces between the vanes, as shown at 94 in FIG. 1. A guillotine knife 100 is provided adjacent the delivery station and has a curved blade 102 which lies in the arcuate path of the outer edges 54, 62 of the vanes of each pair, and is operative to slice off the edible meat 92, which falls into the container 33 for removal and use.

As stated above, each cam surface 93 terminates just on the downstream side of the delivery station or cut-off point, and when rollers 72 of each movable vane leave the cam surfaces the spring 74 moves the movable vane to its normal position away from the associated fixed vane. When this occurs the vanes are moving downwardly below the horizontal and the bone and other trash remaining between the vanes of each pair leaving the delivery station fall from between the vanes into a container for removal.

Above the lowest point of travel of the vanes means are provided for directing a stream or spray of water downwardly to wash the vanes, and this may take the form of an inverted V-shaped water shield or deflector 110, which is supported by wires 112 on shaft 8, and below which there is a pipe 114 having holes therein through which water is sprayed upwardly toward the shield, which directs the water downwardly between the separated vanes.

It will be seen that the facing surfaces of the two vanes of each pair are preferably flat so that crab pieces may be put on them at the loading station.

I claim:
1. A machine for removing the meat from the top cut meat-containing part of a hard shell crab body, comprising a rotatable body, a plurality of fixed radial vanes arranged in a circular series about the axis of rotation of said body, a plurality of movable radial vanes arranged in a circular series about the axis of rotation of said structure each of which is positioned adjacent one of said fixed vanes and is normally spaced therefrom to permit a meat-containing part of a crab body to be positioned between the vanes, means for rotating the body, and means operable during a part of the rotational travel thereof to move each movable vane toward its associated fixed vane to squeeze the crab body part therebetween thereby to remove the meat therefrom, in which the rotatable body comprises two spaced, parallel, circular side plates mounted on a concentric rotatable axis, and the fixed vanes extend between the side plates adjacent the peripheries thereof.

2. A machine according to claim 1, in which each fixed vane has a flat surface in the direction away from the direction of rotation of the rotatable body.

3. A machine according to claim 1, in which the means to move the movable vanes comprises at least one cam surface which is curved in the direction of movement of the rotating body and which extends through only a part of the travel of the rotating body, and an arm on each movable vane having a part positioned to engage said cam surface thereby to move the movable vane toward the fixed vane during engagement of the arm part with the cam surface.

References Cited

UNITED STATES PATENTS

| | | | |
|---|---|---|---|
| 2,494,914 | 1/1950 | Urschel et al. | 146—83 |
| 3,251,091 | 5/1966 | Altman | 17—2 |
| 3,298,412 | 1/1967 | Smida | 146—83 |

LUCIE H. LAUDENSLAGER, *Primary Examiner.*

U.S. Cl. X.R.

17—48